United States Patent
Yamakage (10) Patent No.: US 11,259,070 B2
(45) Date of Patent: Feb. 22, 2022

(54) PACKET GENERATION APPARATUS AND METHOD

(71) Applicants: KABUSHIKI KAISHA TOSHIBA, Minato-ku (JP); Toshiba Infrastructure Systems & Solutions Corporation, Kawasaki (JP)

(72) Inventor: Tomoo Yamakage, Yokohama (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 44 days.

(21) Appl. No.: 16/817,079

(22) Filed: Mar. 12, 2020

(65) Prior Publication Data

US 2020/0329270 A1    Oct. 15, 2020

(30) Foreign Application Priority Data

Apr. 11, 2019 (JP) .............................. JP2019-075686

(51) Int. Cl.
*H04N 21/43* (2011.01)
*H04N 21/2368* (2011.01)
*H04N 21/434* (2011.01)

(52) U.S. Cl.
CPC ..... *H04N 21/4305* (2013.01); *H04N 21/2368* (2013.01); *H04N 21/4307* (2013.01); *H04N 21/4341* (2013.01)

(58) Field of Classification Search
CPC . H04L 63/0428; H04L 65/601; H04L 65/607; H04L 2463/121; H04N 21/242;
(Continued)

(56) References Cited

U.S. PATENT DOCUMENTS 8,098,973 B2 * 1/2012 Kelly ................. H04N 21/4147
386/214
2010/0110916 A1 * 5/2010 Pratt, Jr ................. H04W 24/00
370/252
(Continued)

FOREIGN PATENT DOCUMENTS

JP    2012-137900 A    7/2012
JP    2019-186812 A    10/2019
(Continued)

OTHER PUBLICATIONS

A. Sato, et al., "Development of MPEG-2 TS Multiplex Equipment", NEC Technical Journal, vol. 57, No. 4, 2004, 10 pages (with English Translation).

(Continued)

*Primary Examiner* — Marsha D Banks Harold
*Assistant Examiner* — Dharmesh J Patel
(74) *Attorney, Agent, or Firm* — Oblon, McClelland, Maier & Neustadt, L.L.P.

(57) ABSTRACT

According to an embodiment, a packet generation apparatus includes: a converter configured to convert Temps Atomique International (TAI) time into an STC counter value; a sampling unit configured to obtain a PCR value by sampling the STC counter value converted by the converter in accordance with a first timing; a packet generator configured to generate a TS packet in which the PCR value obtained by the sampling unit is described, and to output the TS packet in accordance with a second timing; and a timing controller configured to determine the first timing and the second timing.

5 Claims, 11 Drawing Sheets

(58) Field of Classification Search
CPC ............. H04N 21/835; H04N 21/4305; H04N 21/2347; H04N 21/2368; H04N 21/4307; H04N 21/4341; H04N 21/4408; H04N 21/8547; H01L 2924/20; H01L 2924/181; H01L 2924/171

See application file for complete search history.

(56) References Cited

U.S. PATENT DOCUMENTS

| | | |
|---|---|---|
| 2010/0208042 A1 | 8/2010 | Ikeda et al. |
| 2014/0079368 A1 | 3/2014 | Sasaki et al. |
| 2016/0112974 A1* | 4/2016 | Shenoi ............... H04W 56/009 370/350 |
| 2018/0124451 A1* | 5/2018 | Takahashi .......... H04N 21/8547 |
| 2019/0319776 A1 | 10/2019 | Yamakage |
| 2020/0213381 A1 | 7/2020 | Yamakage |

FOREIGN PATENT DOCUMENTS

| | | | |
|---|---|---|---|
| JP | 2020-108054 A | 7/2020 | |
| WO | WO 2010/038365 A1 | 4/2010 | |
| WO | WO 2013/136754 A1 | 9/2013 | |
| WO | WO-2015068352 A1 * | 5/2015 | ......... H04N 21/4305 |
| WO | WO 2017/026248 A1 | 2/2016 | |

OTHER PUBLICATIONS

"Information technology—Generic coding of moving pictures and associated audio information: Systems". ISO/IEC. 2000, pp. 1-174.

SMPTE Standard, "Generation and Alignment of Interface Signals to the SMPTE Epoch". SMPTE ST. 2059-1:2015 , 31 pages.

Schulzrinne, H., et al. "RTP: A Transport Protocol for Real-Time Application", Jul. 2003, 116 pages.

IEEE Standard for a Precision Clock Synchronization Protocol for Networked Measurement and Control Systems, in *IEEE Std 1588-2008 (Revision of IEEE Std 1588-2002)*, Jul. 24, 2008, 289 pages.

* cited by examiner

| Syntax | No. of bits | Mnemonic |
|---|---|---|
| transport_packet(){ | | |
|     sync_byte | 8 | bslbf |
|     transport_error_indicator | 1 | bslbf |
|     payload_unit_start_indicator | 1 | bslbf |
|     transport_priority | 1 | bslbf |
|     PID | 13 | uimsbf |
|     transport_scrambling_control | 2 | bslbf |
|     adaptation_field_control | 2 | bslbf |
|     continuity_counter | 4 | uimsbf |
|     if(adaptation_field_control == '10' \|\| adaptation_field_control == '11'){<br>        adaptation_field()<br>    }<br>    if(adaptation_field_control == '01' \|\| adaptation_field_control == '11') {<br>        for (i = 0; i < N; i++){<br>            data_byte<br>        }<br>    }<br>} | 8 | bslbf |

F I G. 3A

| Syntax | No. of bits | Mnemonic |
|---|---|---|
| adaptation_field() { | | |
|     adaptation_field_length | 8 | uimsbf |
|     if (adaptation_field_length > 0) { | | |
|         discontinuity_indicator | 1 | bslbf |
|         random_access_indicator | 1 | bslbf |
|         elementary_stream_priority_indicator | 1 | bslbf |
|         PCR_flag | 1 | bslbf |
|         OPCR_flag | 1 | bslbf |
|         splicing_point_flag | 1 | bslbf |
|         transport_private_data_flag | 1 | bslbf |
|         adaptation_field_extension_flag | 1 | bslbf |
|         if (PCR_flag == '1') { | | |
|             program_clock_reference_base | 33 | uimsbf |
|             reserved | 6 | bslbf |
|             program_clock_reference_extension | 9 | uimsbf |
|         } | | |
|         if (OPCR_flag == '1') { | | |
|             original_program_clock_reference_base | 33 | uimsbf |
|             reserved | 6 | bslbf |
|             original_program_clock_reference_extension | 9 | uimsbf |
|         } | | |
|         if (splicing_point_flag == '1') { | | |
|             splice_countdown | 8 | tcimsbf |
|         } | | |
|         if (transport_private_data_flag == '1') { | | |
|             transport_private_data_length | 8 | uimsbf |
|             for (i = 0; i < transport_private_data_length; i++) { | | |
|                 private_data_byte | 8 | bslbf |
|             } | | |
|         } | | |
|         if (adaptation_field_extension_flag == '1') { | | |
|             adaptation_field_extension_length | 8 | uimsbf |
|             ltw_flag | 1 | bslbf |
|             piecewise_rate_flag | 1 | bslbf |
|             seamless_splice_flag | 1 | bslbf |
|             af_descriptor_not_present_flag | 1 | bslbf |
|             reserved | 4 | bslbf |
|             if (ltw_flag == '1') { | | |
|                 ltw_valid_flag | 1 | bslbf |
|                 ltw_offset | 15 | uimsbf |
|             } | | |
|             if (piecewise_rate_flag == '1') { | | |
|                 reserved | 2 | bslbf |
|                 piecewise_rate | 22 | uimsbf |
|             } | | |
|             if (seamless_splice_flag == '1') { | | |
|                 Splice_type | 4 | bslbf |
|                 DTS_next_AU[32..30] | 3 | bslbf |
|                 marker_bit | 1 | bslbf |
|                 DTS_next_AU[29..15] | 15 | bslbf |
|                 marker_bit | 1 | bslbf |
|                 DTS_next_AU[14..0] | 15 | bslbf |
|                 marker_bit | 1 | bslbf |
|             } | | |
|             if (af_descriptor_not_present_flag == '0') { | | |
|                 for (i = 0; i < N1; i++) { | | |
|                     af_descriptor() | | |
|                 } | | |
|             } | | |
|             else { | | |
|                 for (i = 0; i < N2; i++) { | | |
|                     reserved | 8 | bslbf |
|                 } | | |
|             } | | |
|         } | | |
|         for (i = 0; i < N3; i++) { | | |
|             stuffing_byte | 8 | bslbf |
|         } | | |
|     } | | |
| } | | |

PACKET GENERATION APPARATUS AND METHOD

CROSS-REFERENCE TO RELATED APPLICATIONS

This application is based upon and claims the benefit of priority from Japanese Patent Application No. 2019-075686, filed Apr. 11, 2019, the entire contents of which are incorporated herein by reference.

FIELD

Embodiments described herein relate generally to a packet generation apparatus and a packet generation method that generate TS packets used for synchronization control in a broadcasting system including terrestrial digital broadcasting, satellite broadcasting, CATV, IP retransmission system, etc.

BACKGROUND

At present, in a broadcast system (including a distribution system) for terrestrial digital broadcasting, satellite broadcasting, CATV, IP retransmission systems, etc., a redundant system including a working system and an auxiliary system is constructed in expectation of an apparatus fault, apparatus maintenance during broadcasting, and the like (see, for example, NEC Technical Journal, Vol. 57, No. 4/2004, "Development of Multiplexing Apparatus").

In this kind of broadcasting system configured to be redundant, in order to execute seamless system switching between the working system and auxiliary system, it is imperative to synchronize STC (System Time Clock) counter values of a TS (Transport Stream) (T-STD model) between the systems (see, for example, International Publication No. WO2017/026248).

In order to synchronize STC counter values, STC counter values are first sampled, and are input as a PCR (Program Clock Reference) via a DVB-ASI interface, which is generally a coaxial cable, into respective devices (e.g., an MPEG encoder and a TS multiplexing apparatus) in a PCR packet format of TS. Thereby, the STC counter values in the respective devices are synchronized.

However, under a conventional broadcasting system in which a redundant system is constructed using TS, STC counter values are generated for respective devices. Therefore, each device has its own STC counter value, and STC counter values are not necessarily synchronized between various devices.

In recent years, for dispersion of risks posed to a broadcasting facility at the time of a disaster such as an earthquake, there has been discussion to make a redundant system from a combination of devices installed at mutually remote places.

As described above, there is no guarantee that STC counter values in devices installed at remote places will become equivalent to each other at the same time. In an attempt to address the above, if a PCR packet used in one device is transmitted to another device, a transmission delay or transmission jitter occurs. Similarly, a transmission delay occurs between devices whose actual locations cannot be specified, such as devices on a cloud. Transmission of a PCR packet of a TS layer to another device cannot equalize STC counter values of remote devices at the same time.

Accordingly, for example, with respect to a video frame with the absolute time of 09:00:00, a device X adds STC counter value A as a presentation time, whereas another device Y at a place remote from the device X adds (A-(transmission delay)) as a presentation time. Thus, if the working system is switched to the auxiliary system, various presentation times are added to the video frame of 09:00:00 to which the same original STC counter values are added. This causes a skip or repeat in images, thereby making it impossible to realize seamless switching.

BRIEF DESCRIPTION OF THE DRAWINGS

FIG. 3B is a data structure diagram of an adaptation_field( );

DETAILED DESCRIPTION

Hereinafter, embodiments of the present invention will be described with reference to the accompanying drawings.

According to an embodiment, a packet generation apparatus includes: a converter configured to convert Temps Atomique International (TAI) time into an STC counter value; a sampling unit configured to obtain a PCR value by sampling the STC counter value converted by the converter in accordance with a first timing; a packet generator configured to generate a TS packet in which the PCR value obtained by the sampling unit is described, and to output the TS packet in accordance with a second timing; and a timing controller configured to determine the first timing and the second timing.

First Embodiment

A packet generation apparatus that employs a packet generation method according to a first embodiment will be described.

Figure 1:
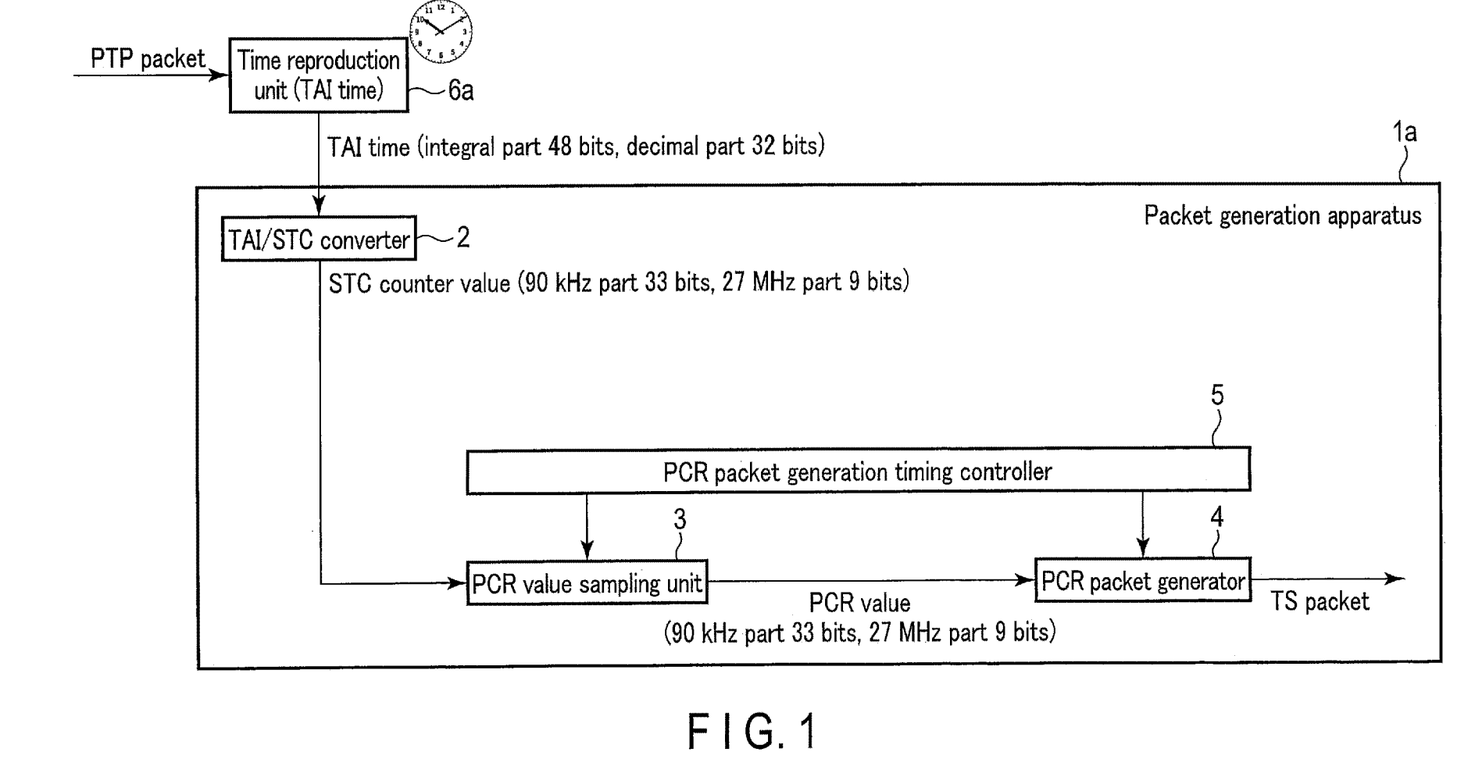
FIG. 1 is a block diagram including a configuration example of a packet generation apparatus that employs a packet generation method according to a first embodiment.

FIG. 1 is a block diagram including a configuration example of the packet generation apparatus that employs the packet generation method according to the first embodiment.

A packet generation apparatus 1a includes a TAI/STC converter 2, a PCR value sampling unit 3, a PCR packet generator 4, and a PCR packet generation timing controller 5.

Figure 2:
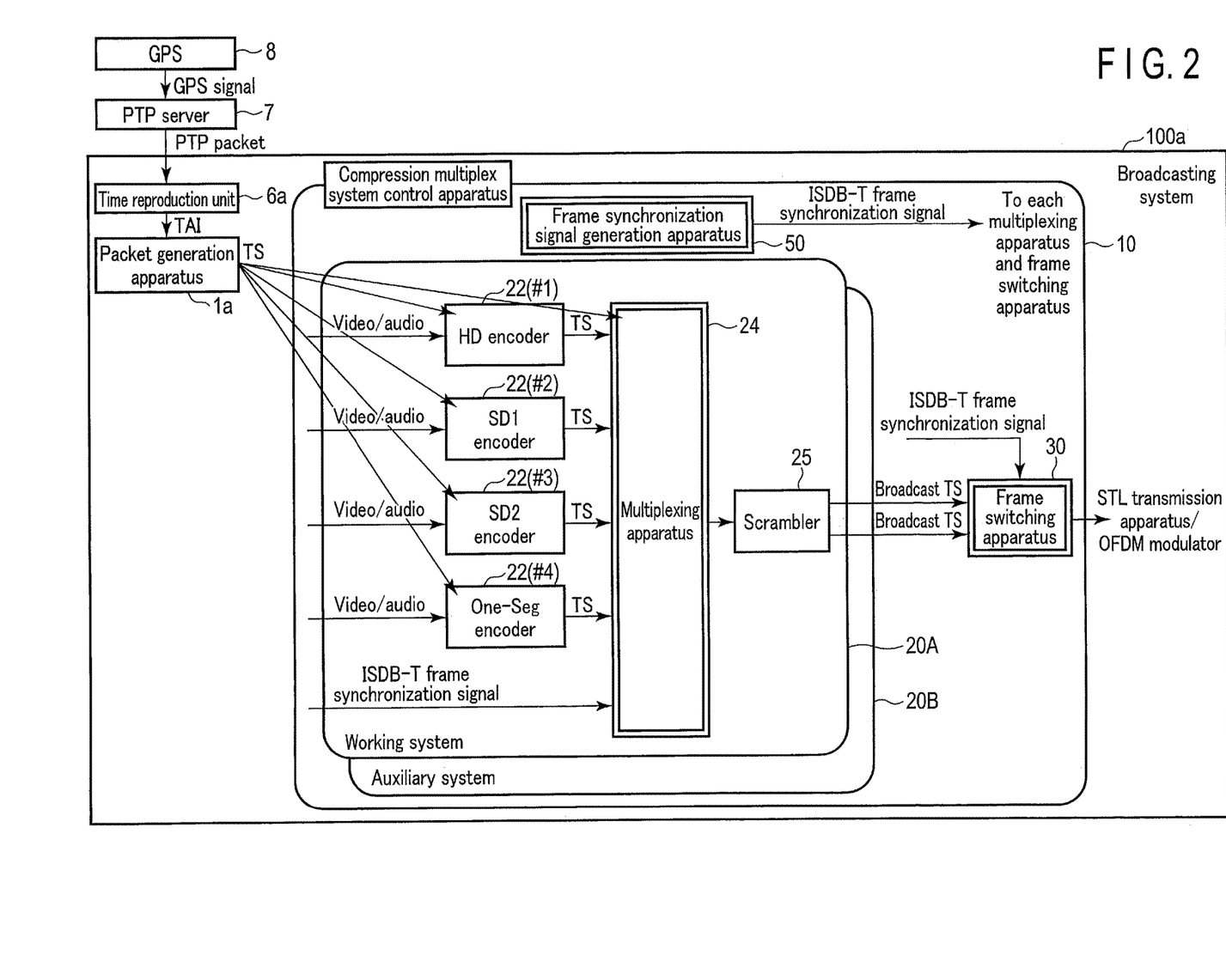
FIG. 2 is a block diagram showing a configuration example of a broadcasting system that adopts the packet generation apparatus that employs the packet generation method according to the first embodiment.

FIG. 2 is a block diagram showing a configuration example of a broadcasting system that adopts the packet generation apparatus that employs the packet generation method according to the first embodiment.

As shown in FIG. 2, the packet generation apparatus 1a is adopted by a broadcasting system 100a (including a distribution system) for terrestrial digital broadcasting, satellite broadcasting, CATV, IP retransmission systems etc. To be more specific, the packet generation apparatus 1a is used by being incorporated in each of the devices that constitute the broadcasting system 100a, such as a plurality of encoders 22 and a plurality of multiplexing apparatuses 24 that are adopted by the broadcasting system 100a.

In FIG. 2, a PTP server 7 receives a GPS signal output from a GPS 8, and based on the GPS signal, generates and outputs a PTP packet on which TAI time is stamped.

A time reproduction unit 6a receives the PTP packet output from the PTP server 7 and samples Temps Atomique International (TAI) time, which is stamped on the PTP packet. The TAI time is a time based on Jan. 1, 1970 as the epoch time, using the same approach as SMPTE ST 2059-1, 2.

Specifically, based on Jan. 1, 1970 as the epoch time, the time reproduction unit 6a sets the STC counter value at this time to zero, and reproduces TAI time from the PTP packet.

The TAI/STC converter 2 converts the TAI time reproduced by the time reproduction unit 6a to STC counter values in a manner described below.

The TAI time is expressed, for example, using 80 bits in total, which include 48 bits of an integral part and 32 bits of a decimal part. A 64-bit CPU, which is now widely used, cannot simply perform arithmetic operations which handle 80 bits.

In addition, in the TAI time, a decimal fraction (e.g., recurring decimal), which cannot be expressed exactly as a power of 2, is handled. Thus, unless a mapping method is made unique, an error occurs between different devices when the TAI time is converted to STC counter values. By rounding a decimal part of the TAI time using a predetermined rule (e.g., rounding-off to millisecond precision) before executing conversion, the TAI time can be handled in 64-bit operations.

However, with the millisecond precision, it is not possible to obtain 27 MHz precision (1 clock=about 37 nanoseconds), which is required for STC counter values, and a problem occurs depending on the systems it is to be applied to. Thus, the TAI/STC converter 2 converts the TAI time to STC counter values with a higher precision by the method described below.

Specifically, the TAI/STC converter 2 repeats a process of narrowing the range of values which are handled in the range in which calculation by 64-bit operations is possible, so that an error occurs only in the last step.

In this process, a time length (e.g. $2^{33}/90{,}000$ seconds), in which the STC counter value turns over, is determined, and a remainder of the time length (e.g. $2^{33}/90{,}000$ seconds) relative to the TAI time is calculated. Specifically, in order to calculate the remainder, a remainder of an integer or a finite decimal, which is obtained by multiplying the time length (e.g. $2^{33}/90{,}000$ seconds) in which the STC counter value turns over by an integer, is calculated. It should be noted, however, that when the remainder is calculated by the finite decimal, the TAI time and the finite decimal are multiplied by $10^n$ (n is a natural number), so that the finite decimal becomes an integer.

Next, the calculated remainder is converted to the STC counter value (e.g., a time for PCR composed of a base of 90 kHz and an extension of 27 kHz). Specifically, the STC counter value composed of a base of a first frequency (90 kHz) and an extension of a second frequency (28 MHz) is determined.

A concrete example of the above process is shown below.

Here, as regards the TAI time, an integer part is 48 bits (binary number) and a decimal part is 32 bits (0~999,999,999*$10^{-9}$), and is substantially 30 bits.

Integer part (48 bits)
1234 5678 9ABC (hexadecimal notation)
20,015,998,343,868 (decimal notation)
Decimal part (32 bits, substantially 30 bits since the decimal part is in the range of 0~0.999 999 999 (decimal notation))
1234 5678 (hexadecimal notation)
0.305 419 896 (decimal notation).

A description is further given by using 20,015,998,343, 868.305 419 896 seconds in decimal notation as an example.

At this time point, a precision of 78 (=48+30) bits is necessary, and the precision is insufficient in 64-bit arithmetic operations.

Since $2^{33}$ clock@90 kHz=95443.7176888888 . . . seconds is an infinite decimal, this is multiplied by 5625 and rounded to an integer. Thereby, the infinite decimal becomes 95,443.7176888888 . . . ×5,625=536,870,912 seconds. Specifically, in 536,870,912 seconds, $2^{33}$ clock@90 kHz turns over (circles) 5,625 times. Since counting starts once again from 0 after the turnover, the necessary information is a remainder (modulo) after the turnover.

Thereby, by finding the modulo of 536,870,912 seconds, a dynamic range of the integer part is reduced.

20,015,998,343,868%536,870,912=377,002,684 seconds.

Thereby, the integer part is reduced to a 29-bit width of 0-536,870,911 (0x1FFF FFFF), and a precision of 59 (=29+30) bits is obtained together with the decimal part. If the residual integer part and decimal part are added, 536,870, 912.305 419 896 seconds are obtained (1).

At this stage, if the number of cycles at 27 MHz is calculated, 536,870,912.305 419 896/(1/27,000,000)=1.449 551 463 224 633e+16 is obtained. Specifically, the required precision of the arithmetic operation is 64 bits.

In order to separate a 90 kHz part (base) and 27 MHz part (extension) of the STC counter value, a value (integer) obtained by division by 300 is calculated for the base, and the modulo of 300 is calculated for the extension.

base=(1.449551463224633×$10^{16}$)/300=48,318,382, 107,487 extension=(1.449551463224633×$10^{16}$)%300=234.

When the base part is expressed in hexadecimal notation, 0x2BF2 0000 6B5F, if a part exceeding 33 bits is discarded (wrapped), then 0x0 0000 6B5F (27,487 in decimal notation) is obtained. This is (Result 1).

Note that a general expression of a floating fraction is 52 bits for a mantissa part, 11 bits for an exponent part, and 1 bit for a sign, and thus a rounding-off error occurs in handling an integer of 64-bit precision at a time of performing a floating-point arithmetic operation.

Next, a case is described in which the dynamic range is further reduced before finding the number of cycles at 27 MHz.

If the above-described (1) is expressed in nanoseconds, 536,870,912,305,419,896 nanoseconds are obtained. If 95443.7176888888 . . . seconds are multiplied by 9, then 858,993.4592 seconds, i.e. 858,993,459,200,000 nanoseconds, are obtained. When nanoseconds are considered as the unit, the last five digits of the divisor of the modulo operation are 0. Accordingly, the modulo operation is performed by using 100,000 nanoseconds as the unit, and the dynamic range is further reduced. Thereby, since the range of 0-95443.7176888888 is obtained, the precision becomes 47 (=17+30) bits.

536,870,912,305,4%858,993,459,2 (commas for division of digits are intentionally placed at positions of the nanosecond notation)

=5,368,709,123,054%8,589,934,592

=3,054

=305,4 (100,000 nanoseconds).

If the above-described modulo and the last five digits, which were ignored at the time of calculating the modulo, are combined, 305,419,896 nanoseconds are obtained. The first six digits are 305,419 microseconds. Since the STC counter value is counted at 27 MHz (27 cycles are counted per 1 microsecond), the count value becomes 8,246,313 cycles.

On the other hand, since the last three digits are 0.896 microseconds, 0.896×27=24.192 cycles. By rounding off, 24 cycles are obtained. By adding this to the above, 8,246,337 cycles@27 MHz are obtained.

In order to separate a 90 kHz part (base) and 27 MHz part (extension) of the STC counter value, a value (integer) obtained by division by 300 is calculated for the base, and the modulo of 300 is calculated for the extension.

base=8,246,337/300=27,487 extension=8,246,337 300=237.

Here, if the base is a value exceeding $2^{33}$, the last 33 bits expressed by binary numbers are set as the base, and the wrap process is not necessary in the above arithmetic operation result. This is (Result 2).

If (Result 1) and (Result 2) are compared, there is an error of 3 clocks in the 27 MHz precision, as described below.

(Result 1) 27,487 (base), 234 (extension)

(Result 2) 27,487 (base), 237 (extension).

Since the decoding/presentation timing (DTS value, PTS value) of video/audio may be controlled with a precision of 90 kHz, it can be thought, from the above results, that no problem arises no matter which of the method of (Result 1) and the method of (Result 2) is used.

However, a precision of 27 MHz is expected for the system clock (STC counter value (time for PCR)). Accordingly, when a certain system is constructed, it is desirable to make uniform the arithmetic operation method (precision) in all associated devices. If consideration is given to the difficulty in making uniform the arithmetic operation precision between devices, there is a case in which the method of (Result 2) is preferable to the method of (Result 1).

In particular, in the case of the method of (Result 1), it is necessary to make uniform not only the procedures, but also the floating-point arithmetic operation parts.

The TAI/STC converter 2 outputs the STC counter value, which is obtained by the arithmetic operation as described above, to the PCR value sampling unit 3.

The PCR value sampling unit 3 obtains a PCR value by sampling the STC counter value output from the TAI/STC converter 2, in accordance with the first timing determined by the PCR packet generation timing controller 5.

The PCR packet generator 4 writes the PCR value sampled by the PCR value sampling unit 3 in a PCR field within adaptation_field( ) of a TS packet, thereby generating a PCR packet in which the PCR value is described. The PCR packet generator 4 then outputs the generated PCR packet in TS packet format, in accordance with the second timing determined by the PCR packet generation timing controller 5.

Figure 3A:
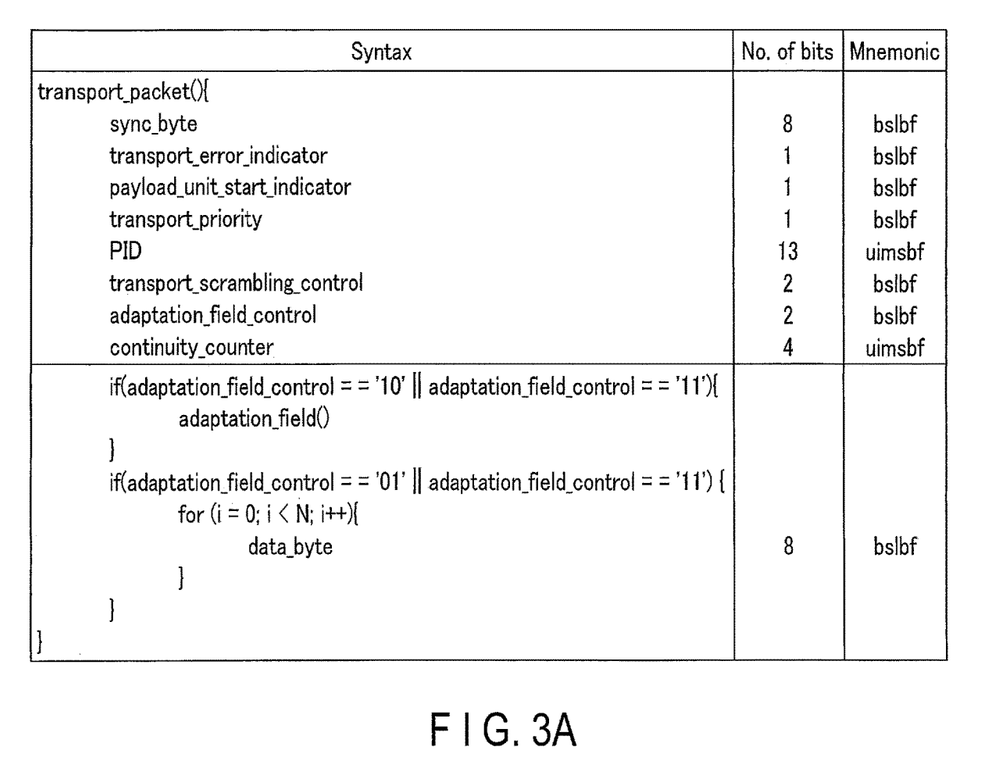
FIG. 3A is a data structure diagram of a TS packet.

FIG. 3A is a data structure diagram of a TS packet. Furthermore, FIG. 3B is a data structure diagram of adaptation_field( ).

The structure diagram of a TS packet shown in FIG. 3B and the structure diagram of adaptation_field( ) shown in FIG. 3A are excerpts from ISO/IEC 13818-1. As shown in FIG. 3A, adaptation_field( ) is included in a TS packet. Furthermore, a PCR value is included in the structure diagram for adaptation_field( ) in particular, each of program_clock_reference_base and program_clock_reference_extension.

The PCR packet generation timing controller 5 determines the first timing and the second timing, and exerts control in a manner such that the PCR value sampling unit 3 samples a PCR value at the first timing and the PCR packet generator 4 generates a TS packet at the second timing. For example, although there is a certain time difference between the first timing and the second timing, their cycles are the same.

A TS packet output from the PCR packet generator 4 is used for synchronizing STC counter values in respective devices within the broadcasting system 100a, such as the encoders 22 and the multiplexing apparatus 24, which each have the packet generation apparatus 1a incorporated.

The broadcasting system 100a shown by way of example in FIG. 2 includes a compression multiplex system control apparatus 10.

The compression multiplex system control apparatus 10 compression-encodes video/audio, generates broadcast TS signals according to a predetermined broadcast method such as a terrestrial digital broadcast method, and outputs the broadcast TS signals to transmission equipment such as an STL transmission apparatus/OFDM modulator.

The compression multiplex system control apparatus 10 includes a working system 20A and an auxiliary system 20B that have the same configuration, for the purpose of redundancy. Each of the working system 20A and auxiliary system 20B includes the plurality of encoders 22 (for example, HD encoder 22 (#1), SD1 encoder 22 (#2), SD2 encoder 22 (#3), and One-Seg encoder 22 (#4)), the multiplexing apparatus 24, and a scrambler 25.

The compression multiplex system control apparatus 10 includes a frame switching apparatus 30 which is provided common to the working system 20A and auxiliary system 20B.

The compression multiplex system control apparatus 10 further includes a frame synchronization signal generation apparatus 50 which generates ISDB-T (Integrated Services Digital Broadcasting-Terrestrial) frame synchronization signals, and outputs the generated ISDB-T frame synchronization signals to the multiplexing apparatus 24. Although ISDB-T is described here by way of example, the frame synchronization signal generation apparatus 50 is also applicable to other broadcasting methods using TS, such as ISDB-S, ATSC (Advanced Television Systems Committee standards), and DVB (Digital Video Broadcasting) methods.

Each of HD encoder 22 (#1), SD1 encoder 22 (#2), SD2 encoder 22 (#3), and One-Seg encoder 22 (#4) compression-encodes video/audio, executes TS or TS over IP implementation of the compression-encoded video/audio by synchronizing STC counter values inside the respective devices using PCR packets received from the packet generation apparatus 1a, and outputs the result to the multiplexing apparatus 24. The video/audio can be formed as MoIP packets.

The video signals and PTP packets can be input to each of the encoders 22 (#1), 22 (#2), 22 (#3) and 22 (#4) by an Ethernet (registered trademark) cable. Although FIG. 2 illustrates four encoders 22 (#1), 22 (#2), 22 (#3) and 22 (#4) by way of example, the number of encoders 22 is not limited to four, and may be three or less, or five or more.

The multiplexing apparatus 24 multiplexes the video/audio, which is compression-encoded by each of the encoders 22 (#1), 22 (#2), 22 (#3) and 22 (#4), into a broadcast TS signal having an ISDB-T frame structure, by using the PCR packets received from the packet generation apparatus 1a and the ISDB-T frame signals output from the frame synchronization signal generation apparatus 50, and outputs the broadcast TS signal to the scrambler 25.

The scrambler 25 executes a scramble process on the broadcast TS signal which is output from the multiplexing apparatus 24, and outputs the scramble-processed broadcast TS signal to the frame switching apparatus 30.

The frame switching apparatus 30 performs frame phase adjustment on the broadcast TS signal which is output from the scrambler 25, by using the ISDB-T frame synchronization signals received from the frame synchronization signal generation apparatus 50, and outputs the frame-phase-adjusted broadcast TS signal to transmission equipment such as an STL transmission apparatus, OFDM modulator, or the like.

In the devices within the broadcasting system 100a described above, the PCR packet generation apparatus 1a is incorporated into each of the encoders 22 and the multiplexing apparatus 24 in each of the working system 20A and the auxiliary system 20B. The packet generation apparatus 1a is incorporable into the scrambler 25, too.

STC counter values to which respective devices refer need to be synchronized in order to realize seamless switching of redundant systems between transmission facilities which are located at remote places or whose locations cannot be specified, such as a transmission facility construction for a business continuity plan (BCP) or a cloud.

In the broadcasting system 100a, the packet generation apparatus 1a is incorporated into each of the devices such as the encoders 22 and the multiplexing apparatus 24 so that the inside of an STC counter in each of the devices is reproduced from TAI time reproduced from a PTP packet. This enables the devices to have equivalent STC counter values regardless of their physical locations, arrangements, and network configurations.

As described above, the packet generation apparatus 1a can be incorporated into every device in each of the working system 20A and the auxiliary system 20B, such as the encoders 22, the multiplexing apparatus 24, and the scrambler 25.

STC counter values in the devices into which the packet generation apparatuses 1a are respectively incorporated can be synchronized by TS packets output from the packet generation apparatuses 1a. Furthermore, TS packets can be distributed to existing devices by conventionally used DVB-ASI. This enables STC counter values to be synchronized between the devices without depending on their installation locations, arrangements, and network configurations, while each of the devices keeps their parts other than the packet generation apparatus 1a unchanged in terms of hardware configuration. Accordingly, the broadcasting system 100a can be constructed in such a manner that even when the devices are installed at physically remote places, such as in a virtual environment on a cloud, for example, STC counter values can be synchronized between the devices, while realizing seamless switching from the working system 20A to the auxiliary system 20B.

Therefore, as in an application constructed on a cloud, even in multi-angle, picture-in-picture, etc. in which TS packets generated at a plurality of locations are put together as one service, and even when physical positions, arrangements, network configurations, etc. of devices, which execute applications, cannot correctly be understood or controlled, a TS that enables synchronization of videos/audio between the devices can be generated.

If a redundant system is constructed using a TS output from devices located at remote places, a delay in transmission to the frame switching apparatus 30 may vary between the devices or transmission jitter may be applied. Thus, countermeasures are required. An input unit of the frame switching apparatus 30 can correct a difference in transmission delay by setting, with respect to a TS generated based on the present invention, a value to a timestamp field of a RTP packet header by the method described by way of example in RFC 3550.

(Modification)

A modification of the first embodiment will be described.

Figure 4:
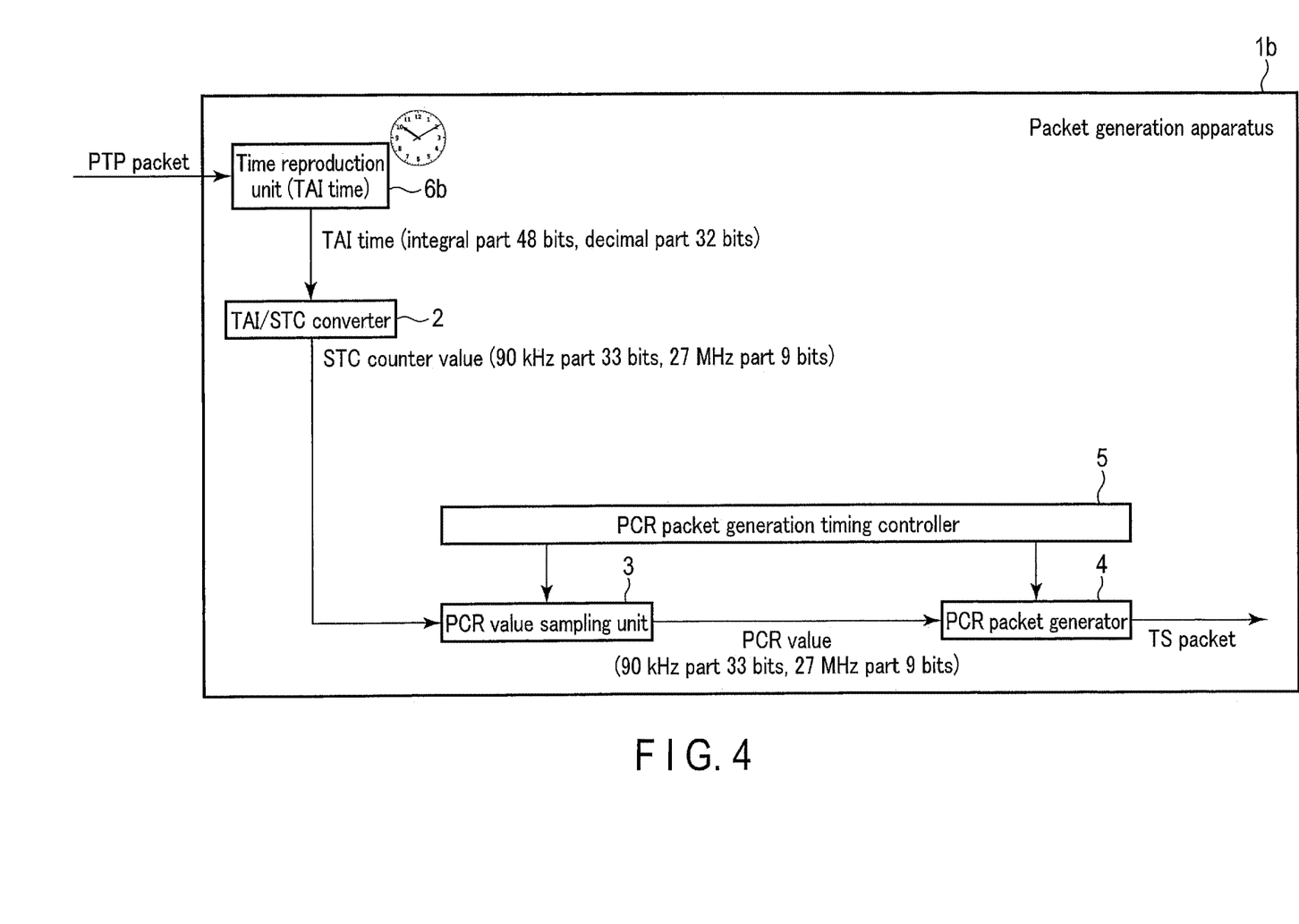
FIG. 4 is a block diagram including a configuration example of a packet generation apparatus that employs a packet generation method according to a modification of the first embodiment.

FIG. 4 is a block diagram including a configuration example of a packet generation apparatus that employs a packet generation method according to the modification of the first embodiment.

A packet generation apparatus 1b according to the modification of the first embodiment is configured in a manner such that a time reproduction unit 6b is incorporated into the packet generation apparatus 1a shown by way of example in FIG. 1. The time reproduction unit 6b has the same structure as that of the time reproduction unit 6a shown in FIG. 1 by way of example.

Figure 5:
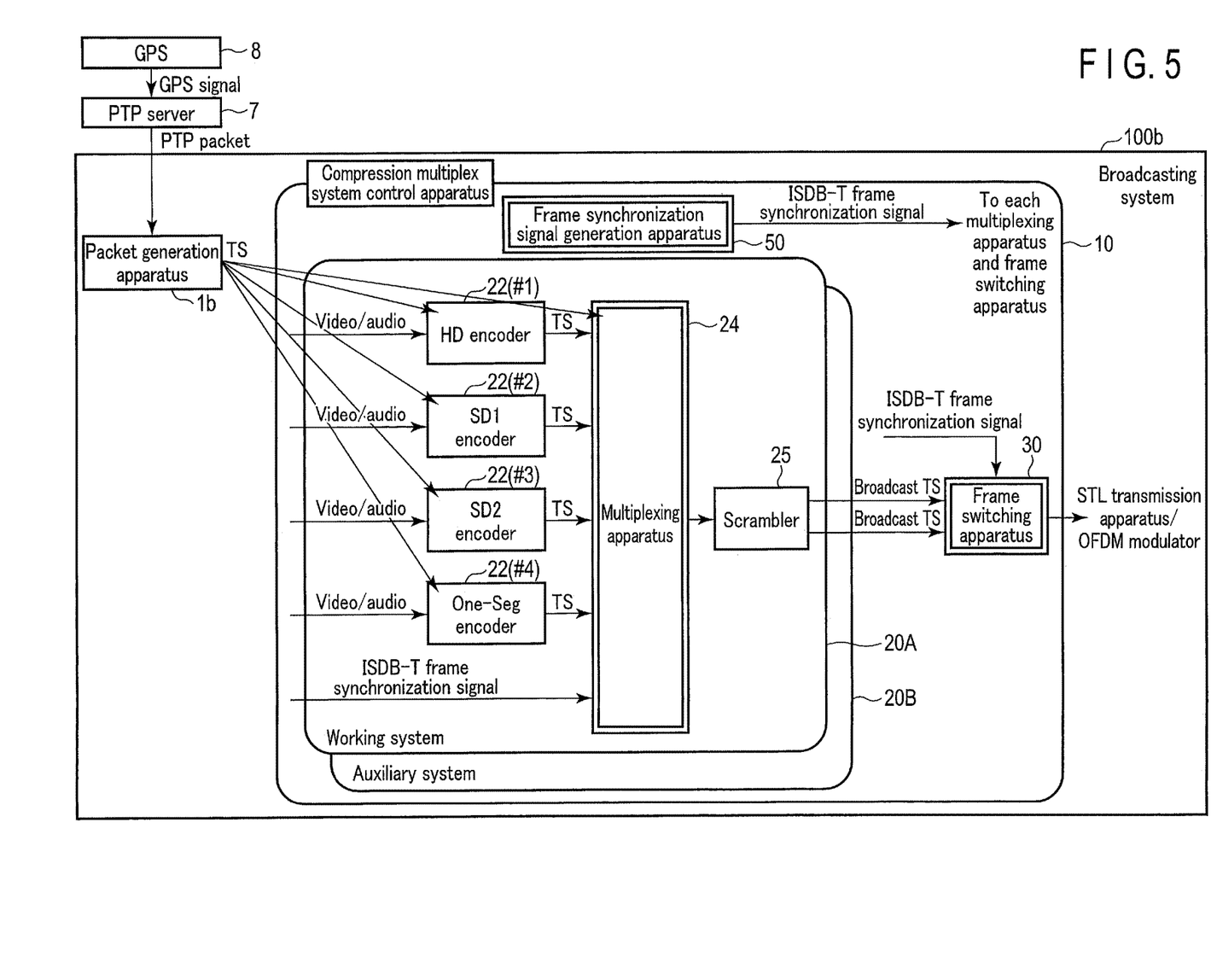
FIG. 5 is a block diagram showing a configuration example of a broadcasting system that adopts the packet generation apparatus that employs the packet generation method according to the modification of the first embodiment.

FIG. 5 is a block diagram showing a configuration example of a broadcasting system that adopts the packet generation apparatus that employs the packet generation method according to the modification of the first embodiment.

A broadcasting system 100b that adopts the packet generation apparatus 1b according to the modification of the first embodiment omits the time reproduction unit 6a shown by way of example in FIG. 2 and includes a packet generation apparatus 1b instead of the packet generation apparatus 1a.

Like the packet generation apparatus 1a, even the packet generation apparatus 1b into which the time reproduction unit 6b is built can ultimately output TS packets based on PTP packets output from PTP server 7. Thus, the packet generation apparatus 1b can produce similar advantageous effects to those of the packet generation apparatus 1a.

Second Embodiment

A packet generation apparatus that employs a packet generation method according to a second embodiment will be described.

In the present embodiment, the same structural elements as those in the above-described first embodiment will be assigned the same reference numerals, and their descriptions will be omitted to avoid duplication.

Figure 6:
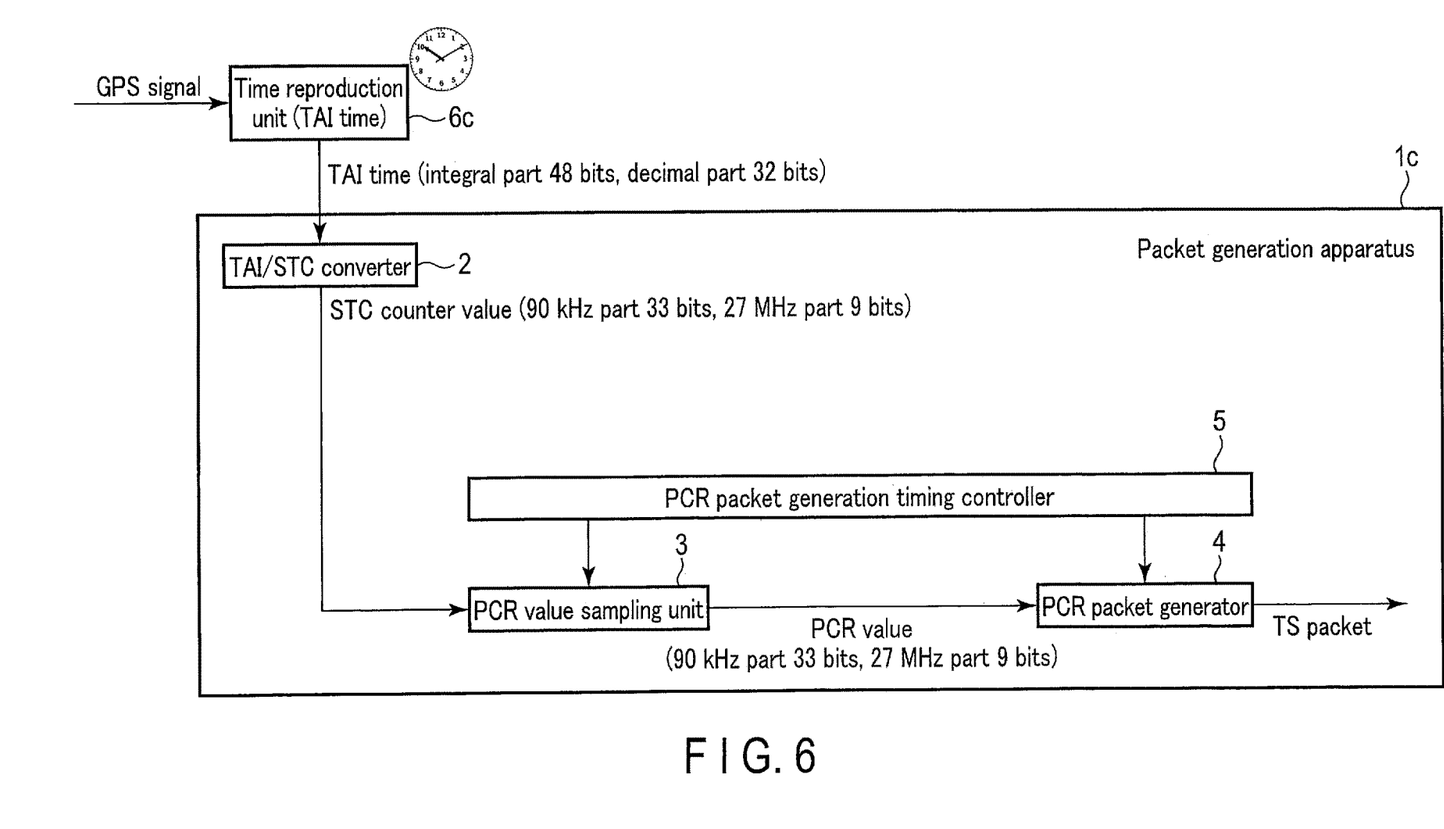
FIG. 6 is a block diagram including a configuration example of a packet generation apparatus that employs a packet generation method according to a second embodiment.

FIG. 6 is a block diagram including a configuration example of the packet generation apparatus that employs the packet generation method according to the second embodiment.

FIG. 6 differs from FIG. 1 in having a time reproduction unit 6c instead of the time reproduction unit 6a; however, the packet generation apparatus 1c has the same structure as that of the packet generation apparatus 1a.

Figure 7:
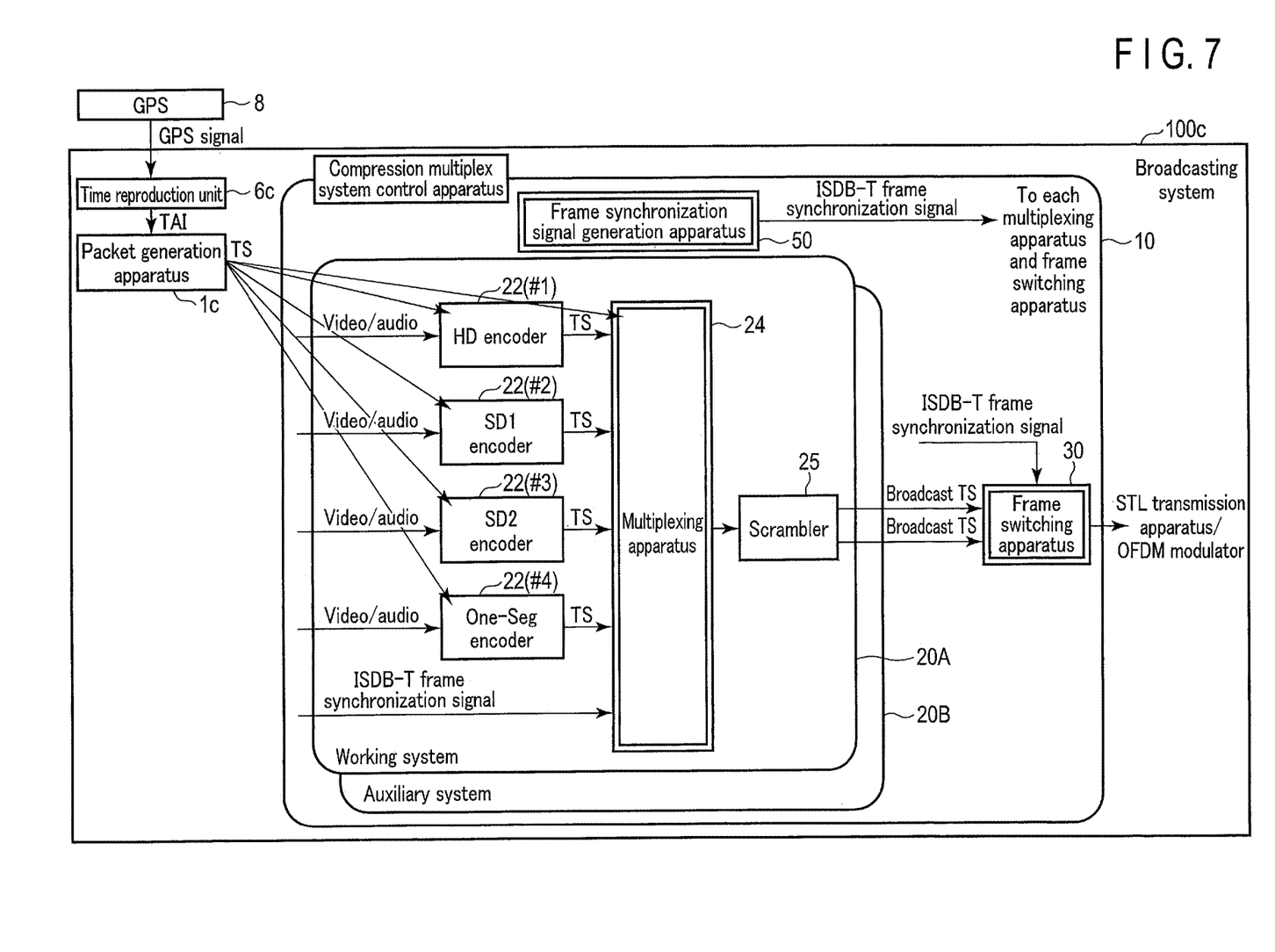
FIG. 7 is a block diagram showing a configuration example of a broadcasting system that adopts the packet generation apparatus that employs a packet generation method according to the second embodiment.

FIG. 7 is a block diagram showing a configuration example of a broadcasting system that adopts the packet generation apparatus that employs the packet generation method according to the second embodiment.

A broadcasting system 100c includes the time reproduction unit 6c, the packet generation apparatus 1c, and the compression multiplex system control apparatus 10.

The time reproduction unit 6c differs from the time reproduction unit 6a in reproducing TAI time from a GPS signal from GPS 8.

As described above, the packet generation apparatus 1c has the same structure as that of the packet generation apparatus 1a and is incorporated, like the PCR packet generation apparatus 1a, into each of the devices such as the encoders 22 and the multiplexing apparatus 24 within the compression multiplex system control apparatus 10. Then, based on the TAI time reproduced by the time reproduction unit 6c, the packet generation apparatus 1c performs a process similar to that performed by the packet generation apparatus 1a, and ultimately outputs a TS packet.

As described in the first embodiment, output TS packets can be distributed to existing devices by conventionally used DVB-ASI. Thus, even if PTP packets are not used for the synchronization between devices which are installed at remote places, the time reproduction unit 6c receives radio waves from a satellite positioning system such as GPS 8 and reproduces TAI time, and the packet generation apparatus 1c is individually installed in each of the devices such as the encoders 22 and the multiplexing apparatus 24. With this configuration, the second embodiment can produce similar advantageous effects to those of the first embodiment.

(Modification)

A modification of the second embodiment will be described.

Figure 8:
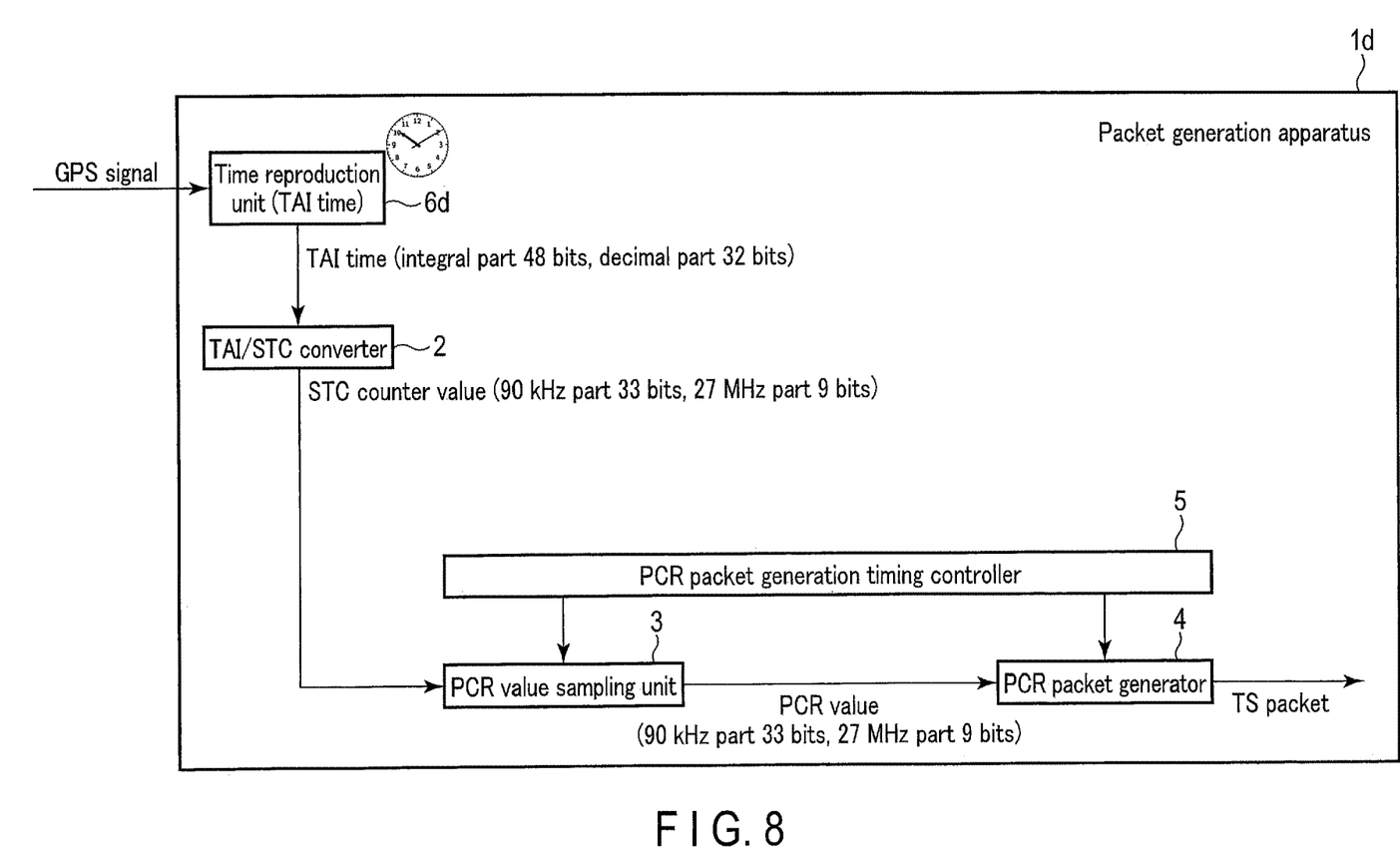
FIG. 8 is a block diagram including a configuration example of a packet generation apparatus that adopts a packet generation method according to a modification of the second embodiment.

FIG. 8 is a block diagram including a configuration example of a packet generation apparatus according to a modification of the second embodiment.

A packet generation apparatus 1d that employs a packet generation method according to a modification of the second embodiment is configured in a manner such that a time reproduction unit 6d is incorporated into the packet generation apparatus 1c shown by way of example in FIG. 6. The time reproduction unit 6d has the same structure as that of the time reproduction unit 6c shown in FIG. 6 by way of example.

Figure 9:
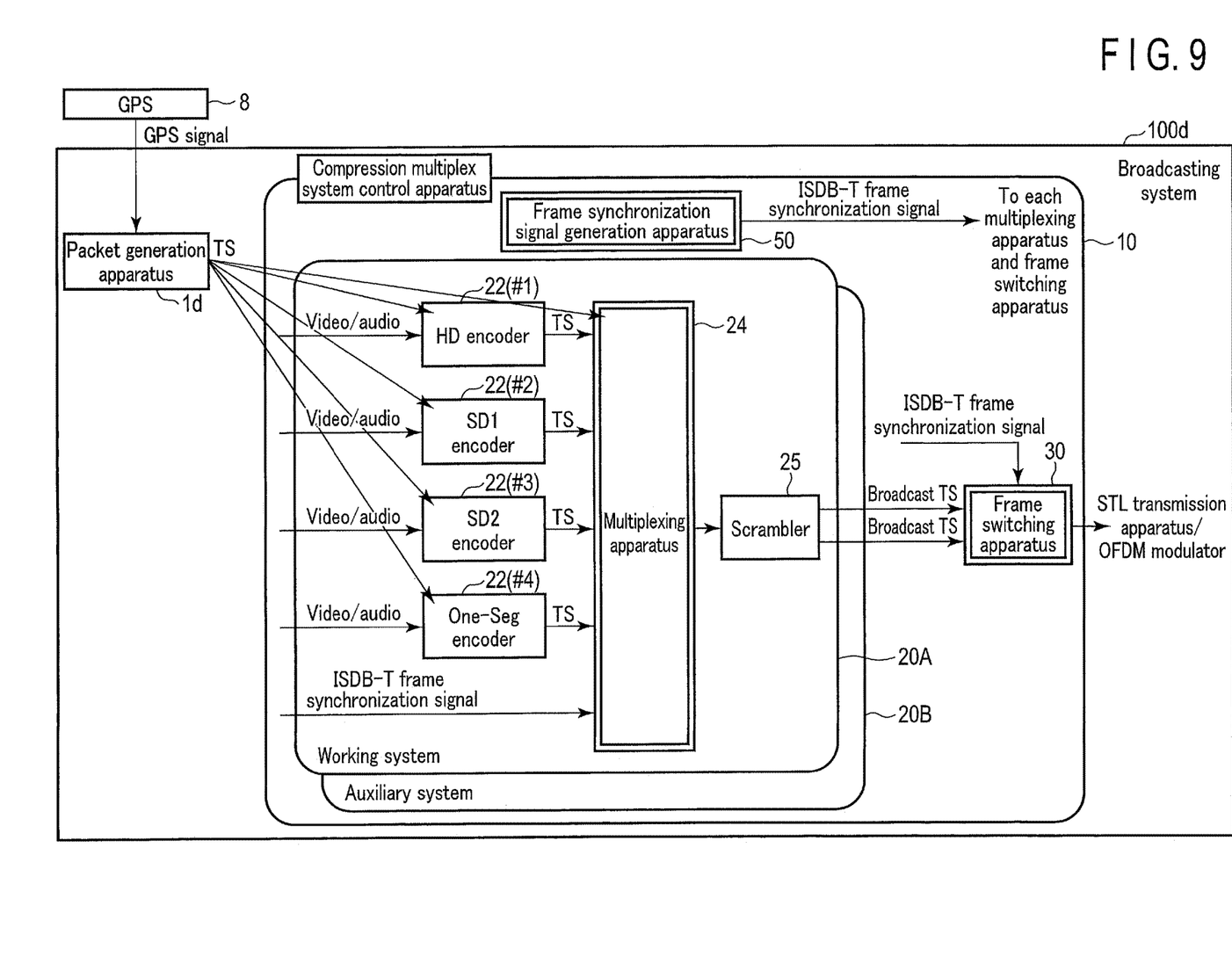
FIG. 9 is a block diagram showing a configuration example of a broadcasting system that adopts the packet generation apparatus that employs the packet generation method according to the modification of the second embodiment.

FIG. 9 is a block diagram showing a configuration example of a broadcasting system that adopts the packet generation apparatus according to the modification of the second embodiment.

A broadcasting system 100d that adopts the packet generation apparatus 1d according to the modification of the second embodiment omits the time reproduction unit 6c shown by way of example in FIG. 7 and includes a packet generation apparatus 1d instead of the packet generation apparatus 1c.

Like the packet generation apparatus 1c, even the packet generation apparatus 1d into which the time reproduction unit 6d is built can ultimately output TS packets based on PTP packets output from GPS 8. Thus, the packet generation apparatus 1d can produce similar advantageous effects to those of the packet generation apparatus 1c.

Third Embodiment

A third embodiment will be described.

Figure 10:
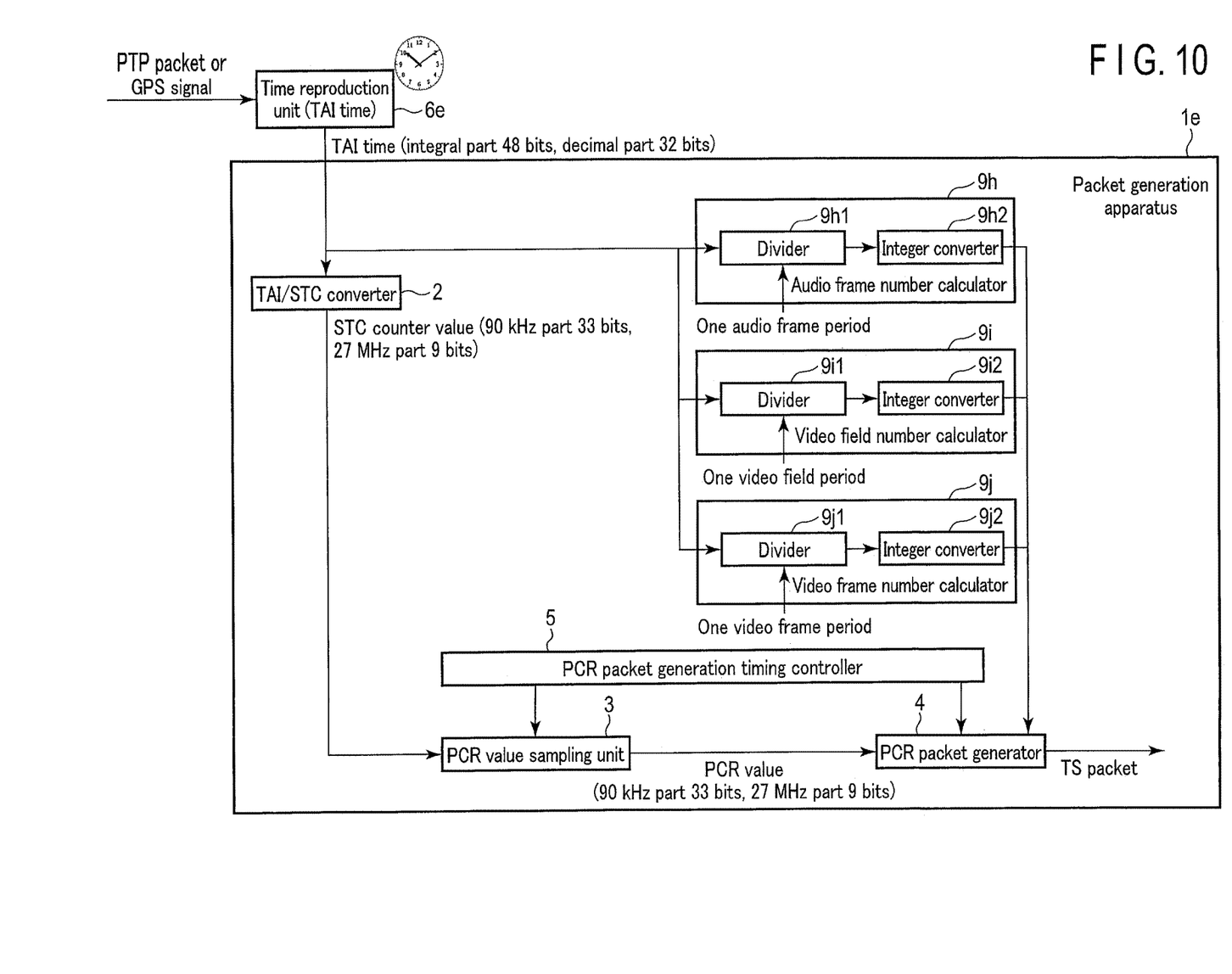
FIG. 10 is a block diagram showing a configuration example of a packet generation apparatus that employs a packet generation method according to a third embodiment.

FIG. 10 is a block diagram showing a configuration example of a packet generation apparatus that employs a packet generation method according to a third embodiment.

A packet generation apparatus 1e according to the third embodiment is configured in a manner such that the packet generation apparatus 1a or 1c according to the first or second embodiment additionally includes an audio frame number calculator 9h, a video field number calculator 9i, and a video frame number calculator 9j.

Furthermore, a time reproduction unit 6e has a similar structure to that of the time reproduction unit 6a or 6c. With a similar structure to that of the structure of the time reproduction unit 6a, the time reproduction unit 6e reproduces TAI time from a PTP packet. With the structure of the time reproduction unit 6c, the time reproduction unit 6e reproduces TAI time from a GPS signal.

The packet generation apparatus 1e may be configured in such a manner as to have the time reproduction unit 6e incorporated therein.

The audio frame number calculator 9h, the video field number calculator 9i, and the video frame number calculator 9j are each connected in parallel to the TAI/STC converter 2, thereby being able to receive TAI time output from the time reproduction unit 6.

The audio frame number calculator 9h, the video field number calculator 9i, and the video frame number calculator 9j include dividers 9h1, 9i1, and 9j1, and integer converters 9h2, 9i2, and 9j2. The dividers 9h1, 9i1, and 9j1 divide TAI time output from the time reproduction unit 6 by one audio frame period, one video field period, and one video frame period, respectively. The integer converters 9h2, 9i2, and 9j2 set quotients obtained by the division by the dividers 9h1, 9i1, and 9j1 to an audio frame number, a video field number, and a video frame number, respectively.

In this case, the respective calculators may be configured in consideration of the arithmetic operation precision. For example, the audio frame number calculator 9h may be configured in a manner such that, in the case of 48 kHz Fs, one audio frame period is set to 1024/48000 seconds. The video field number calculator 9i may be configured in a manner such that in the case of signal of 59.94i, one video field period is set to 1000/(30*1001) seconds. The video frame number calculator 9j may be configured in a manner such that in the case of a signal of 59.94i, one video frame period is set to 1000/(30*1001) seconds.

Regarding videos, errors can be prevented in the implementation with the low arithmetic operation precision by controlling integer-converting timing using a Black Burst (B.B.) signal generated based on SMPTE ST 2059. For example, if a Vsync (frame synchronizing signal) based on B.B. becomes active when a decimal part of a division result ranges from 0.9 to 0.999 . . . , a value is rounded off at the time of integer conversion. Even if a division result is equal to or greater than 1.0, a value is not updated at the time of integer conversion until Vsync becomes active.

As described above, the audio frame number calculator 9h, the video field number calculator 9i, and the video frame number calculator 9j calculate an audio frame number, a video field number, and a video frame number, respectively, based on TAI time, and output them to the PCR packet generator 4.

The PCR packet generator 4 writes into a designated data field within a TS packet, the audio frame number output from the audio frame number calculator 9h, the video field number output from the video field number calculator 9i, and the video frame number output from the video frame number calculator 9j, and then outputs the TS packet.

This enables the PCR packet generator 4 to output a TS packet with the addition of additional information such as an audio frame number, a video field number, and a video frame number.

Similar advantageous effects can be produced by even a packet generation apparatus configured in a manner such that the packet generation apparatus 1b or 1d according to the modification of the first embodiment or the modification of the second embodiment additionally includes the audio frame number calculator 9h, the video field number calculator 9i, and the video frame number calculator 9j.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A packet generation apparatus comprising:
   a converter configured to convert TAI (Temps Atomique International) time into an STC (System Time Clock) counter value;
   a sampling unit configured to obtain a PCR (Program Clock Reference) value by sampling the STC counter value converted by the converter in accordance with a first timing;
   a packet generator configured to generate a TS (Transport Stream) packet in which the PCR value obtained by the sampling unit is described, and to output the TS packet in accordance with a second timing; and
   a timing controller configured to determine the first timing and the second timing.

2. The packet generation apparatus according to claim 1, further comprising a reproduction unit configured to reproduce the TAI time from a PTP (Precision Time Protocol) packet.

3. The packet generation apparatus according to claim 1, further comprising a reproduction unit configured to reproduce the TAI time from a GPS (Global Positioning System) signal.

4. The packet generation apparatus according to claim 1, further comprising:
   a first calculator configured to calculate an audio frame number based on the TAI time;
   a second calculator configured to calculate a video field number based on the TAI time; and
   a third calculator configured to calculate a video frame number based on the TAI time, wherein the packet generator writes the audio frame number, the video field number, and the video frame number into the generated TS packet before outputting the TS packet.

5. A packet generation method, comprising:
   converting TAI (Temps Atomique International) time into an STC (System Time Clock) counter value;
   sampling the converted STC counter value in accordance with a first timing;
   generating a TS (Transport System) packet in which a sampled PCR (Program Clock Reference) value is described; and
   outputting the generated TS packet in accordance with a second timing.

* * * * *